Dec. 12, 1950  J. B. STEIDING  2,533,332
FILAMENT TESTER
Filed April 11, 1945
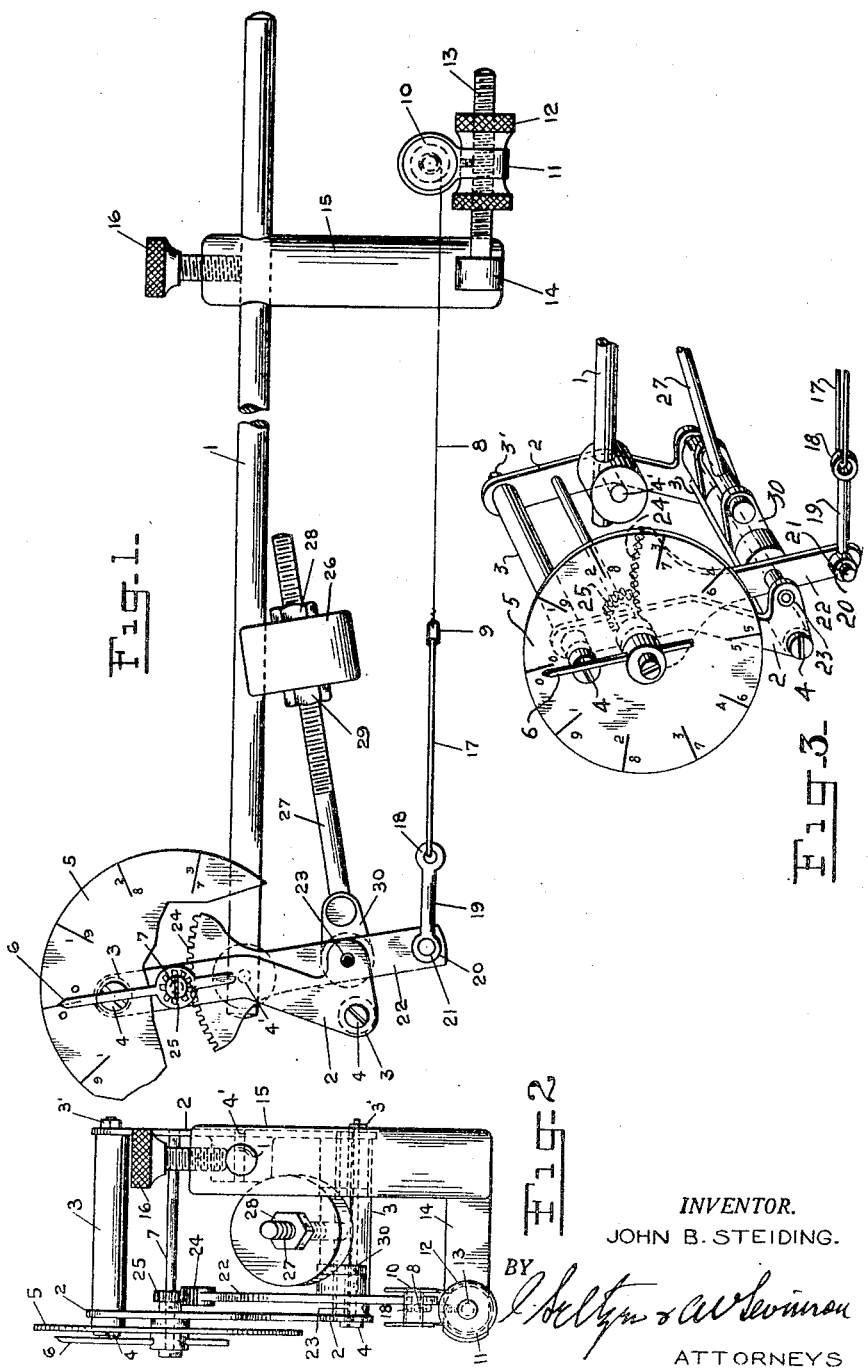
INVENTOR.
JOHN B. STEIDING.
BY
ATTORNEYS Patented Dec. 12, 1950

2,533,332

UNITED STATES PATENT OFFICE 2,533,332

FILAMENT TESTER

John B. Steiding, Midland, Md., assignor to Celanese Corporation of America, a corporation of Delaware Application April 11, 1945, Serial No. 587,661

3 Claims. (Cl. 73—95)

This invention relates to testing apparatus and relates more particularly to a novel testing device adapted to indicate the linear response of filamentary materials such as yarns or threads when subjected to various treatments or to loading.

An object of this invention is the provision of an improved device for testing yarns or threads under tension.

Another object of this invention is to provide a sensitive testing device for use with yarns or threads under tension and adapted to indicate any relative change in the length of the yarn or thread being tested as the latter is subjected to treatment in various media having a physical or chemical action on said yarns or threads.

Other objects of this invention will appear from the following detailed description and the accompanying drawing.

In the drawing, wherein the preferred embodiment of my invention is shown,

Fig. 1 is a side elevational view of my novel testing device showing the yarn or thread in testing position and the dial upon which the linear variations are indicated, Fig. 2 is an end view looking from right to left, of said testing device, and Fig. 3 is a perspective view of a portion of the testing device showing the interconnection between certain of the elements in greater detail.

Like reference numerals indicate like parts in both views of the drawing.

Referring now to the drawing, and more particularly to Fig. 1 for a specific description of my invention, there is shown a main supporting member comprising a cylindrical rod 1 carrying at one end thereof a pair of irregularly shaped, spaced brackets 2 separated by hollow cylindrical spacers 3 through which threaded bolts 4 are passed, the latter being taken up by nuts 3' to hold the brackets 2 in a rigidly fixed spaced relation. Rod 1 is attached to the bracket assembly by a short cylindrical stud 4' in which said rod is set. Mounted on forward bracket 2 and held in position by upper bolt 4 is circular dial 5, partly broken away, over which is adapted to move an indicating pointer 6 mounted in fixed position on a shaft 7 which is journaled in brackets 2 permitting indicating pointer 6 to move in either a clockwise or counterclockwise direction. The movement of indicating pointer 6 is dependent upon the linear changes in the yarn 8 being tested. Yarn 8 is fixed at one end to an eye 9 and anchored at the other end in a grooved cylinder 10 adapted to hold the yarn firmly without permitting any slippage. Grooved cylinder 10 is provided with a mounting comprising a circular collar 11 loosely fitted about a knurled, internally-threaded sleeve 12 which is screwed on a threaded rod 13. The base of rod 13 is set in an extension or stud 14 which is integral with a bracket 15 slidably mounted on circular rod 1 and adapted to be fixed in any lateral position thereon by a knurled locking screw 16, passing through the top of bracket 15 and cooperating with circular rod 1.

Eye 9, to which one end of yarn specimen 8 is attached, is fixed to a link 17 passing through eye 18 of a bar 19 which is provided with a bearing 20 at the other end thereof journaled on a stub shaft 21 integral with a lever arm 22. The latter is supported by and pivotally mounted on a shaft 23 carried by brackets 2. Lever arm 22 is also provided at its opposite end with a series of teeth forming a rack 24 adapted to mesh with a pinion 25 keyed to the shaft 7 carrying indicating pointer 6.

To provide the desired degree of tension on yarn specimen 8, a counterweight 26 is provided. This counterweight is threaded on and adjustable along the length of a rod 27 and held thereon in any adjusted position by lock nuts 28 and 29. The rod 27 is attached to a link 30 rigidly fixed to arm 22, rod 27 and link 30 forming a lever fulcrumed on shaft 23 so that lever arm 22 is constantly subjected to the clockwise torque or turning moment exerted by the gravitational pull of weight 26.

When it is desired to subject yarn specimen 8 to a particular treatment or to particular loading conditions, the yarn, in any convenient standard length, is fixed at one end to eye 9 and anchored at the other end in grooved cylinder 10. Yarn 8 is then stretched taut by shifting bracket 15 along rod 1 and locking it in the desired position by means of lock screw 16. With counterweight 26 adjusted to exert the desired degree of torque or turning moment on lever arm 22 to place yarn 8 under the desired tension, knurled collar 12 is rotated to cause grooved cylinder 10 to travel in the direction necessary to move rack 24 and thereby pinion 25 to set indicating pointer 6 at the zero mark on indicating dial 5. This action places yarn 8 under a predetermined tension.

With the indicating pointer 6 in zero position, the yarn specimen 8 may then be subjected to various test conditions, such as, for example, variations in temperature or humidity, or to various treatments such as, saponification and the like where yarn 8 has a basis of cellulose acetate or other organic ester of cellulose.

Any change in length in yarn 8 during treatment, under the particular, predetermined degree of tension employed, is observed directly by the clockwise or counterclockwise movement of indicating pointer 6. Thus, for example, if yarn 8 shrinks under a particular treatment, this shrinking action will tend to pivot arm 22 about shaft 23 forcing rack 24 to move in a lefthand direction. This movement will rotate pinion 25 and, therefore, cause pointer 6 to move in a clockwise direction. Where yarn 8 stretches under a given treatment, the increase in length will permit counterweight 26 to fall slightly, thus causing arm 22 to pivot about 23 and move rack 24 in a righthand direction. This righthand directional movement of rack 24 will again cause pinion 25 to rotate forcing indicating pointer 6 to move in a counterclockwise direction.

Thus, any increase or decrease in the length of yarn specimen 8 may be immediately observed by merely watching the movement of indicating pointer 6 across the face of dial 5. The latter may be calibrated to read directly in any desired unit depending upon the particular standard length of yarn chosen and the predetermined degree of tension exerted thereon by the suitably positioned counterweight 26. The effect of subjecting the yarn 8 to several different treatments in sequence is easily observed and the lineal characteristics of the tensioned yarn under these treatments are readily apparent from a direct reading of the position of indicator 6 on dial 5.

It is to be understood that the foregoing detailed description is given merely by way of illustration and that many variations may be made therein without departing from the spirit of my invention.

Having described my invention, what I desire to secure by Letters Patent is:

1. In a device for determining the linear response of a tensioned filamentary material when subjected to physical and chemical treatments, a supporting member, a bracket mounted on said supporting member and adjustable therealong, means on said bracket for holding one end of a specimen of filamentary material, a pair of parallel cooperating brackets mounted on said supporting member, a counterweighted lever arm pivotally supported at one end and mounted between said latter brackets, means for anchoring the other end of the speciman to said lever arm, a rack on said lever arm, a pinion cooperating with said rack and indicating means operatively connected to said pinion, the construction and arrangement being such that the lever arm is responsive to the linear changes of the specimen when under treatment and the indicating means giving a visible indication of said changes.

2. In a device for determining the linear response of a tensioned filamentary material when subjected to physical and chemical treatments, a supporting member, means including a bracket slidably mounted thereon carrying means for holding one end of a specimen of filamentary material, means for locking said bracket at any desired position along said member, means for anchoring the other end of the specimen, means including a pivotally mounted, counterweighted lever arm responsive to linear changes of said specimen when under treatment, said lever arm cooperating with said last-mentioned anchoring means for continuously exerting a predetermined tension on said specimen, a rack on said lever arm, and indicating means including a pinion cooperating with said rack to effect a visible indication of said changes.

3. In a device for determining the linear response of a tensioned filamentary material when subjected to physical and chemical treatment, a supporting member, means including a bracket slidably mounted thereon carrying means adjustable relative to said bracket for holding one end of a specimen of filamentary material, means for locking said bracket at any desired position along said member, means for anchoring the other end of the specimen, means including a pivotally mounted, counterweighted lever arm responsive to linear changes of said specimen when under treatment, said lever arm cooperating with said last-mentioned anchoring means for continuously exerting a predetermined tension on said specimen, a rack on said lever arm, and indicating means including a pinion cooperating with said rack, a pointer connected to said pinion and a calibrated indicating dial to effect a visible indication of said changes.

JOHN B. STEIDING.

REFERENCES CITED

The following references are of record in the file of this patent:

UNITED STATES PATENTS

| Number | Name | Date |
|---|---|---|
| 758,418 | Cock | Apr. 26, 1904 |
| 1,817,617 | Gosch | Aug. 4, 1931 |
| 1,837,577 | Nessler | Dec. 22, 1931 |
| 1,917,597 | Nessler | July 11, 1933 |
| 1,932,682 | Beckley | Oct. 31, 1933 |
| 1,960,675 | Koester | May 29, 1934 |

FOREIGN PATENTS

| Number | Country | Date |
|---|---|---|
| 497,267 | France | Sept. 8, 1919 |